United States Patent
Agrawal et al.

(10) Patent No.: US 10,940,876 B2
(45) Date of Patent: Mar. 9, 2021

(54) ROUTE EXAMINATION SYSTEM

(71) Applicant: General Electric Company, Schenectady, NY (US)

(72) Inventors: Neeraj Agrawal, Bangalore (IN); Dibyajyoti Pati, Bangalore (IN); Prakarsh Paritosh, Bangalore (IN)

(73) Assignee: TRANSPORTATION IP HOLDINGS, LLC, Norwalk, CT (US)

(*) Notice: Subject to any disclaimer, the term of this patent is extended or adjusted under 35 U.S.C. 154(b) by 489 days.

(21) Appl. No.: 15/861,383

(22) Filed: Jan. 3, 2018

(65) Prior Publication Data

US 2018/0215400 A1     Aug. 2, 2018

Related U.S. Application Data

(60) Provisional application No. 62/453,562, filed on Feb. 2, 2017.

(51) Int. Cl.

| | |
|---|---|
| *B61K 9/10* | (2006.01) |
| *B60G 17/0195* | (2006.01) |
| *B61L 23/04* | (2006.01) |
| *G06F 16/683* | (2019.01) |
| *B61L 15/00* | (2006.01) |
| *B61L 25/02* | (2006.01) |
| *B60R 16/023* | (2006.01) |

(52) U.S. Cl.
CPC ............ *B61K 9/10* (2013.01); *B60G 17/0195* (2013.01); *B61L 15/0027* (2013.01); *B61L 15/0081* (2013.01); *B61L 23/044* (2013.01); *B61L 23/045* (2013.01); *B61L 23/047* (2013.01); *B61L 25/021* (2013.01); *B61L 25/025* (2013.01); *B61L 25/026* (2013.01); *G06F 16/683* (2019.01); *B60R 16/0234* (2013.01); *B61L 2205/04* (2013.01)

(58) Field of Classification Search
CPC ......................................................... B61K 9/10
USPC ......................................................... 702/34
See application file for complete search history.

(56) References Cited

U.S. PATENT DOCUMENTS

| | | | |
|---|---|---|---|
| 4,700,223 A | 10/1987 | Shoutaro et al. | |
| 4,779,095 A | 10/1988 | Guerreri et al. | |
| 5,075,772 A | 12/1991 | Gebel et al. | |
| 6,052,631 A | 4/2000 | Busch et al. | |
| 6,064,428 A | 5/2000 | Trosino et al. | |
| 6,216,985 B1 * | 4/2001 | Stephens .................. | B61K 9/10 246/120 |
| 6,273,521 B1 | 8/2001 | Halvorson et al. | |

(Continued)

*Primary Examiner* — Ricky Ngon
(74) *Attorney, Agent, or Firm* — Christopher R. Carroll; The Small Patent Law Group LLC

(57) ABSTRACT

A route examination system determines a characteristic of a vehicle system traveling over a segment of a route under inspection, a characteristic of the route, and/or a characteristic of movement of the vehicle system over the segment of the route. The system also detects acoustic sounds generated by movement of the vehicle system over the segment of the route. The system selects a baseline signature representative of acoustic sounds generated by movement of the vehicle system or another vehicle system over a healthy segment of the route, and determines that the segment of the route under inspection is damaged based on a comparison between the baseline signature and the acoustic sounds generated by the movement of the vehicle system over the segment of the route under inspection.

20 Claims, 6 Drawing Sheets

(56) References Cited

U.S. PATENT DOCUMENTS

| | | | |
|---|---|---|---|
| 6,356,299 B1 | 3/2002 | Trosino et al. | |
| 6,397,131 B1 | 5/2002 | Busch et al. | |
| 7,659,972 B2 | 2/2010 | Magnus et al. | |
| 7,755,660 B2 | 7/2010 | Nejikovsky et al. | |
| 7,801,333 B2 | 9/2010 | Laurent et al. | |
| 8,345,948 B2 | 1/2013 | Zarembski et al. | |
| 9,205,849 B2 | 12/2015 | Cooper et al. | |
| 9,255,913 B2 | 2/2016 | Kumar et al. | |
| 9,459,107 B2 | 10/2016 | Payne et al. | |
| 9,575,007 B2 | 2/2017 | Rao et al. | |
| 9,650,059 B2 | 5/2017 | Cooper et al. | |
| 9,695,760 B2 | 7/2017 | Dufford et al. | |
| 2001/0019263 A1* | 9/2001 | Kwun | G01N 29/2412 324/217 |
| 2002/0033049 A1* | 3/2002 | Amini | B61K 9/10 73/636 |
| 2004/0105608 A1* | 6/2004 | Sloman | B61L 23/045 385/12 |
| 2006/0274930 A1 | 12/2006 | Laurent et al. | |
| 2009/0132179 A1 | 5/2009 | Fu et al. | |
| 2010/0204857 A1* | 8/2010 | Forrest | B61L 27/0094 701/19 |
| 2014/0060190 A1* | 3/2014 | Mian | G01N 29/4427 73/579 |
| 2014/0129154 A1 | 5/2014 | Cooper et al. | |
| 2015/0033864 A1* | 2/2015 | Kumar | G01N 29/265 73/636 |
| 2015/0063575 A1 | 3/2015 | Tan | |
| 2015/0158510 A1 | 6/2015 | Fries et al. | |
| 2016/0009300 A1 | 1/2016 | Cooper et al. | |
| 2017/0106885 A1* | 4/2017 | Singh | G01B 11/22 |
| 2017/0267264 A1* | 9/2017 | English | G01N 27/82 |

\* cited by examiner

ROUTE EXAMINATION SYSTEM

CROSS-REFERENCE TO RELATED APPLICATIONS

This application claims priority to U.S. Provisional Application No. 62/453,562, which was filed on 2 Feb. 2017, and the entire disclosure of which is incorporated herein by reference.

FIELD

The inventive subject matter described herein relates to systems that examine routes for defects or damage.

BACKGROUND

Routes traveled by vehicles may become damaged over time or have defects arising from installation, repair, or maintenance. Systems can examine the routes for damage or defects using a variety of handheld, stationary, or vehicle-based devices. Maintenance or repair can be scheduled for a damaged route based on output from these devices.

One type of damage that may occur with routes traveled by rail vehicles (e.g., tracks) is loose fishplates. A fishplate also can be referred to as a splice bar or joint bar, and includes a body connected to neighboring portions of a rail (i.e., separate but abutting, linearly-adjacent lengths of rail) to join the portions together to create a longer rail.

Over time, fishplates may become loose due to repeated travel of heavy vehicle systems traveling on the rails connected by the fishplates. A loose fishplate can lead to severe damage to vehicle systems, including derailment. Identification of loose fishplates can be difficult to successfully achieve as the rails joined by a fishplate may need to be loaded with a rail vehicle in order to visually identify the loose fishplate. Manual inspection of fishplates can consume a significant amount of time and effort to identify loose fishplates.

BRIEF DESCRIPTION

In one embodiment, a system includes one or more processors configured to determine one or more of a characteristic of a vehicle system traveling over a segment of a route under inspection for damage, a characteristic of the route, or a characteristic of movement of the vehicle system over the segment of the route under inspection. The system also includes one or more acoustic pick-up devices configured to detect acoustic sounds generated by movement of the vehicle system over the segment of the route under inspection. The one or more processors are configured to select a baseline signature representative of acoustic sounds generated by movement of the vehicle system or another vehicle system over a healthy segment of the route, and to determine that the segment of the route under inspection is damaged based on a comparison between the baseline signature and the acoustic sounds generated by the movement of the vehicle system over the segment of the route under inspection.

In one embodiment, a method includes determining one or more of a characteristic of a vehicle system traveling over a segment of a route under inspection for damage, a characteristic of the route, or a characteristic of movement of the vehicle system over the segment of the route under inspection, detecting (with one or more acoustic pick-up devices) acoustic sounds generated by movement of the vehicle system over the segment of the route under inspection, selecting a baseline signature representative of acoustic sounds generated by movement of the vehicle system or another vehicle system over a healthy segment of the route, and determining that the segment of the route under inspection is damaged based on a comparison between the baseline signature and the acoustic sounds generated by the movement of the vehicle system over the segment of the route under inspection.

In one embodiment, a system includes one or more processors configured to determine a characteristic of a rail vehicle system traveling over a segment of a track under inspection, a characteristic of the track under inspection, and a characteristic of movement of the rail vehicle system over the segment of the track under inspection. The system also includes one or more acoustic pick-up devices configured to detect acoustic sounds generated by movement of the rail vehicle system over the segment of the track. The one or more processors are configured to select a baseline signature representative of acoustic sounds generated by movement of another rail vehicle system over a healthy segment of the track, and to determine that the segment of the track under inspection has a loose fishplate based on a comparison between the baseline signature and the acoustic sounds generated by the movement of the rail vehicle system over the segment of the track under inspection.

BRIEF DESCRIPTION OF THE DRAWINGS

Reference is now made briefly to the accompanying drawings, in which.

DETAILED DESCRIPTION

Figure 1:
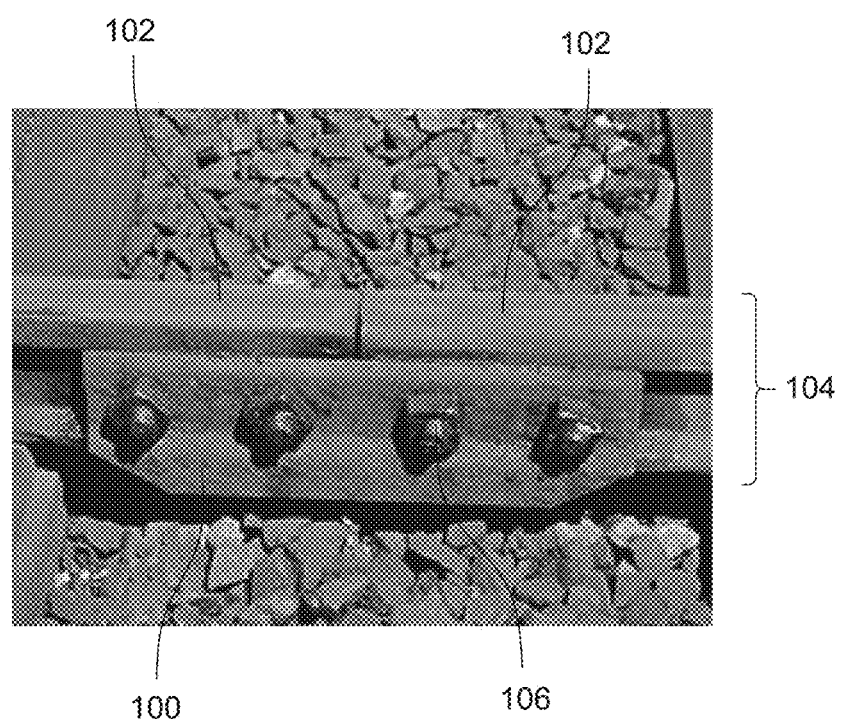
FIG. 1 illustrates a segment of a route that may be inspected for damage by one or more embodiments of route inspection systems described herein.

FIG. 1 illustrates a segment of a route 102 that may be inspected for damage by one or more embodiments of route inspection systems described herein. The route includes elongated rail portions 104 joined with each other (e.g., interconnected with each other) by a fishplate 100, which optionally may be referred to as a splice bar or joint bar. The fishplate is connected with the rail portions by connectors 106, such as bolts or the like.

Over time, one or more of the connectors connecting the fishplate to the rail portions may become loose. This can result in the fishplate become loose (e.g., relative to the rail portions). This also poses a safety risk to vehicle systems traveling on the route, such as an increased risk for derailment relative to fishplates having connectors that are not loose. Several fishplates may be disposed along the route on each rail of the route.

In order to detect and identify which fishplates are damaged (e.g., loose or otherwise damaged), one or more embodiments of route inspection systems described herein may determine acoustic sounds generated by vehicle systems traveling over the fishplates. These acoustic sounds can represent or be used to create an acoustic signature of the vehicle system traveling over a fishplate. The acoustic signature can be compared to one or more baseline signatures that are associated with travel of vehicle systems over healthy (e.g., not damaged or otherwise loose) fishplates. The baseline signature(s) to which the acoustic signature is compared may be based on characteristics of the vehicle system (e.g., vehicle characteristics), characteristics of the route (e.g., route characteristics), and/or characteristics of movement over the route (e.g., movement characteristics). For example, the baseline signature or signatures that previously were measured may be associated with the vehicle characteristics, route characteristics, and/or movement characteristics applicable to the time at which the baseline signature(s) was obtained. The acoustic sounds of travel of a vehicle system over a segment of the route can be recorded while the segment of the route is known to have no damage (or damage that is less than a designated threshold, such as less than 10% pitting on the surface of a rail, less than 5% of the cross-sectional area of a rail has cracks, etc.). These previously recorded sounds can form the baseline signature.

The vehicle characteristics, route characteristics, and/or movement characteristics associated with movement of a vehicle system over a route when the acoustic signature is obtained may be used to find the baseline signature or signatures having the same or similar characteristics (more similar than one or more other baseline signatures) as the acoustic signature. The acoustic signature may be compared to the obtained baseline signature(s) to determine if the acoustic signature deviates from the obtained baseline signature(s) and damage to the route (e.g., a loose fishplate) may be detected or otherwise identified based on the deviation(s). Responsive to determining that the deviation(s) indicate damage to the route (e.g., a loose fishplate), maintenance, repair, and/or inspection of the route at the location where the acoustic signature was obtained may be automatically initiated or performed, and/or movement of the vehicle system or a trailing vehicle system may be altered. For example, a vehicle system subsequently traveling on the same route as the vehicle system from which the acoustic signature was obtained may automatically stop, slow down, or move to another route responsive to the previous vehicle system traveling over and obtaining the acoustic signature associated with the damaged segment of the route.

Figure 2:
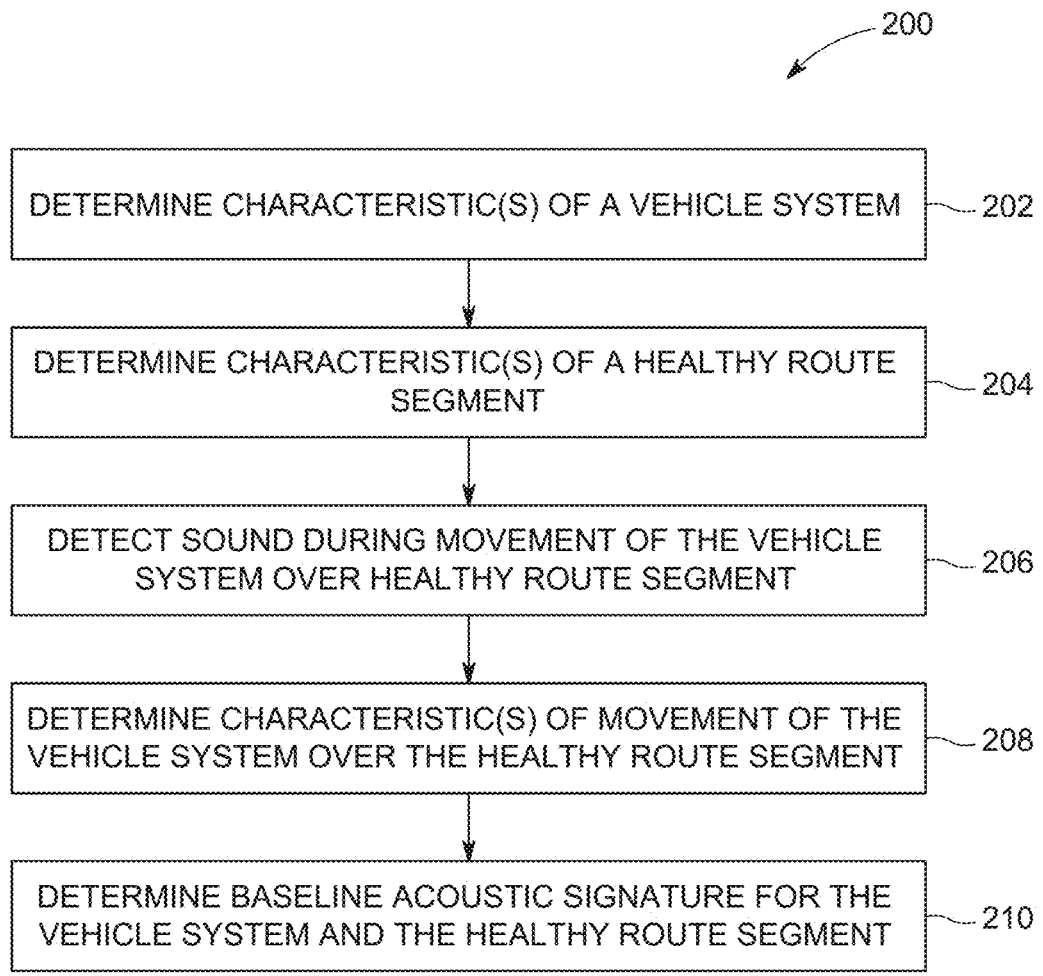
FIG. 2 illustrates a flowchart of one embodiment of a method for determining one or more baseline signatures of a healthy route.

FIG. 2 illustrates a flowchart of one embodiment of a method 200 for determining one or more baseline signatures of a healthy route. The method 200 may be used to generate baseline signatures of sounds generated when different vehicle systems travel over healthy route segments, such as rails having fishplates that are not loose or damaged. The operations of the method 200 may represent a software program or an algorithm useful for creating a software program that directs operations of an analysis device that creates the baseline signatures.

At 202, one or more characteristics of a vehicle system are determined. These characteristics can represent qualities of the vehicle system that is to travel over a healthy route segment or healthy fishplate while sounds are recorded for generation of a baseline signature. In one embodiment, the vehicle system may be a rail vehicle system, such as a single rail vehicle or two or more rail vehicles. Alternatively, the vehicle system may be a non-rail vehicle system, such as a single automobile, single mining vehicle, single truck, etc., or two or more automobiles, mining vehicles, or trucks (e.g., that are logically coupled with each other by communicating with each other to coordinate their movements with each other such that the vehicles travel along the route as a vehicle system).

The vehicle characteristics can be input by an operator of the vehicle system, may be obtained from a memory device (e.g., a computer readable memory, such as a computer hard drive, a removable drive, a flash drive, etc.), or another source. The vehicle characteristics can include a size of the vehicle system, such as a length of the vehicle system or number of vehicles included in the vehicle system. Another vehicle characteristic can include an arrangement or distribution of vehicles in a vehicle system formed from two or more vehicles. For example, the spacing or relative locations of propulsion-generating vehicle(s) and/or non-propulsion-generating vehicle(s) in the vehicle system may be a vehicle characteristic. Another vehicle characteristic can include an arrangement or distribution of weight in the vehicle system. For example, the weight of the vehicle system at different locations along the length of the vehicle system may be another vehicle characteristic.

The vehicle characteristics optionally may include a type of engine in the vehicle system. For example, different makes, model numbers, years of manufacturing, etc., of the engine or engines in the vehicle system may be different vehicle characteristics. Another vehicle characteristic can include the total weight of the vehicle system (instead of or in addition to the arrangement or distribution of weight along the length of the vehicle system, as described above).

The vehicle characteristics can include the location of engines or other sources of sounds onboard the vehicle system relative to acoustic sensors (e.g., acoustic pick-up devices) that sense the sounds made by the vehicle system passing over the route segment. For example, larger distances between the engine(s) and the acoustic sensors may be represented by different vehicle characteristics than shorter distances between the engine(s) and the acoustic sensors.

At 204, one or more characteristics of the healthy route segment are determined. These characteristics can represent qualities of the route segment that the vehicle system is to travel over and that does not include damage (e.g., a loose fishplate) while sounds are recorded for generation of a baseline signature. The route characteristics can be input by an operator of the vehicle system, may be obtained from a memory device, or obtained from another source. The route characteristics can include a location of the route segment over which the sounds are recorded. This location can be determined by a positioning system onboard the vehicle system during movement of the vehicle system over the route segment, such as a global positioning system receiver, a wireless antenna that sends and/or receives wireless signals to triangulate the location of the vehicle system, a dead reckoning system, etc. Alternatively, the location can be input by the operator, obtained from the memory device, or obtained from another source.

The route characteristics can include a type of route feature for which the baseline signature is being generated. For example, the inventive subject matter described herein may be used to generate baseline acoustic signatures for different types of routes (e.g., tracks, roads, etc.) and/or different components of the routes (e.g., fishplates, insulated joints, switches, rumble strips, etc.). This type of route characteristic can be used to associate different route features with different baseline signatures so that different route features can be acoustically inspected.

Optionally, the route characteristics can include weather conditions to which a segment of the route is currently exposed or was exposed to recently (e.g., within the previous hour, day, week, or month). These weather conditions can include temperature, humidity, pressure, wind speed, wind direction, etc. The route characteristics may include a soil type of the terrain over which a route segment extends. The soil type can indicate that the ground beneath the route segment is loose soil, rock, crushed rock, marsh, etc.

At 206, sounds generated during movement of the vehicle system over the healthy route segment are detected. These sounds may be detected by one or more acoustic sensors coupled with the vehicle system and/or disposed alongside the healthy route segment (but off-board the vehicle system). The sounds may be recorded to determine what sounds are created when the vehicle system represented by the vehicle characteristics travels over the healthy route segment having the route characteristics.

At 208, characteristics of movement of the vehicle system over the healthy route segment are determined. These movement characteristics can be determined during or after travel of the vehicle system over the healthy route segment. The movement characteristics can describe how the vehicle system was moving while the sounds were detected, and may include the moving speed of the vehicle system and/or the speed at which one or more engines of the vehicle system were operating.

At 210, a baseline acoustic signature for the vehicle system traveling over the healthy route segment is determined. The baseline signature can represent at least some of the sounds recorded during movement of the vehicle system over the healthy segment of the route. The baseline signature may be associated with one or more of the vehicle characteristics, the route characteristics, and/or the movement characteristics to allow the baseline signature to be compared to acoustic signatures obtained for other vehicle systems having the same or similar vehicle characteristics and traveling over route segments having the same or similar route characteristics.

In one embodiment, the baseline signature for travel over a healthy route segment is created based on the sounds recorded for many different vehicle systems traveling over the same healthy route segment. The vehicle systems may have the same or different vehicle characteristics, and travel of these vehicles over healthy route segments may be associated with different route characteristics and/or different movement characteristics. For example, a baseline signature may be created by averaging the magnitudes (e.g., decibels) of sounds created at different frequencies when multiple vehicle systems having the same or similar vehicle characteristics travel over different segments of a route having the same or similar route characteristics while moving at the same or similar movement characteristics. Different baseline signatures may be created for different vehicle characteristics, different route characteristics, and/or different movement characteristics. Many baseline signatures can be created to ensure that a baseline signature can be compared with any combination of vehicle characteristics, route characteristics, and/or movement characteristics for a segment of a route being inspected, as described below.

The method 200 may be repeated one or more additional times to generate additional acoustic signatures for the same or different characteristics. For example, the method 200 may be performed one or more additional times with one or more different vehicle characteristics, one or more different route characteristics, and/or one or more different movement characteristics. A group or corpus of baseline signatures may be created for the same or several different healthy route segments to allow for a variety of other acoustic signatures to be compared to the baseline signatures and determine whether the acoustic signatures indicate damage to locations along routes that are associated with the acoustic signatures.

Figure 3:
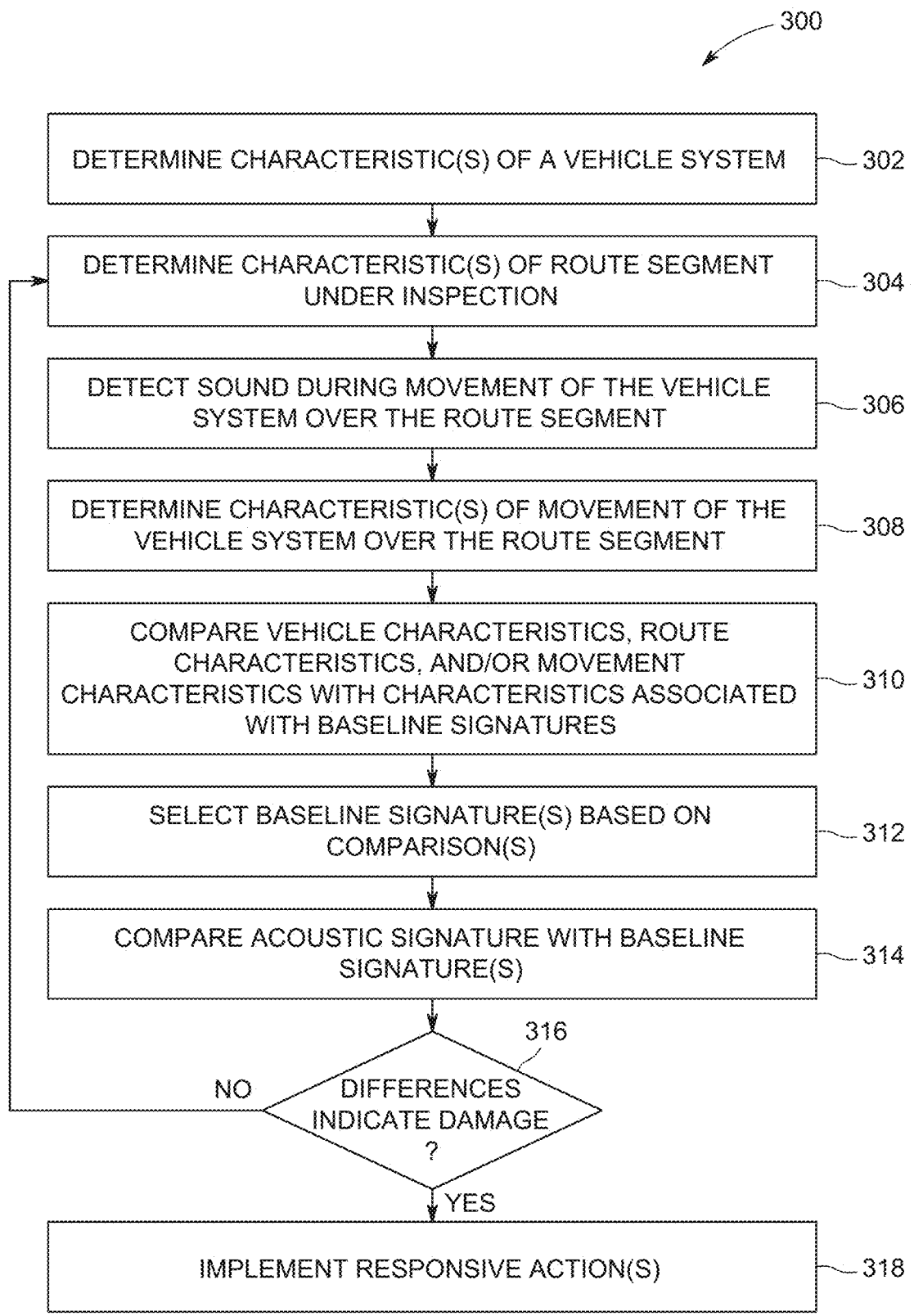
FIG. 3 illustrates a flowchart of one embodiment of a method for examining a route for damage.

FIG. 3 illustrates a flowchart of one embodiment of a method 300 for examining a route for damage. The method 300 may be used to measure acoustic signatures (e.g., information representative of detected sounds) created during passage of a vehicle system over a route. These signatures may be compared to the baseline signatures described above in order to determine whether the segments of the route under inspection for damage are damaged. The operations of the method 300 may represent a software program or an algorithm useful for creating a software program that directs operations of an analysis device that obtains the acoustic signatures and compares the acoustic signatures with the baseline signatures.

At 302, one or more characteristics of a vehicle system are determined. These characteristics can represent qualities of the vehicle system that is to travel over the route segment that is being investigated or examined for damage. The health of the route may be unknown prior to travel of the vehicle system over the route segment. For example, the state of the fishplates of the route may not be known. The vehicle system may be a different vehicle system or the same vehicle system that was used to obtain one or more of the baseline signatures described above. As described above, the vehicle characteristics can be input by an operator of the vehicle system, may be obtained from a memory device (e.g., a computer readable memory, such as a computer hard drive, a removable drive, a flash drive, etc.), or provided from another source.

At 304, one or more characteristics of the route segment being inspected are determined. These route characteristics can represent qualities of the route segment that the vehicle system is to travel over and that may or may not include damage (e.g., a loose fishplate) while sounds are recorded for generation of an acoustic signature for comparison to one or more baseline signatures. The route characteristics can be input by an operator of the vehicle system, may be obtained from a memory device, or obtained from another source.

At 306, sounds generated during movement of the vehicle system over the route segment being inspected are detected. These sounds may be detected by one or more acoustic sensors coupled with the vehicle system and/or disposed alongside the route segment under inspection (but off-board the vehicle system). The sounds may be recorded to determine what sounds are created when the vehicle system represented by the vehicle characteristics travels over the route segment having the route characteristics. These sounds can be compared to one or more of the baseline signatures (or sounds represented by the one or more baseline signatures) to determine whether the route segment under inspection is damaged (e.g., has a loose fishplate).

At 308, characteristics of movement of the vehicle system over the route segment under inspection are determined. These movement characteristics can be determined during or after travel of the vehicle system over the route segment under inspection. The movement characteristics can describe how the vehicle system was moving while the sounds were detected, and may include the moving speed of the vehicle system and/or the speed at which one or more engines of the vehicle system were operating.

At 310, the vehicle characteristic(s), the route characteristic(s), and/or the movement characteristic(s) associated with the route segment under inspection and the vehicle system acoustically inspecting the route segment are compared with corresponding characteristics associated with one or more baseline signatures. Different baseline signatures may be created for different healthy route segments (having different route characteristics), during travel of different vehicle systems over the healthy route segments (having different vehicle characteristics), and/or during different movements of the vehicle systems over the healthy route segments (traveling over the healthy route segments at different moving speeds and/or engine speeds). The route characteristic(s) of the route segment under inspection may be compared to the route characteristic(s) associated with the baseline signature(s), the vehicle characteristic(s) of the vehicle system traveling over the route segment under inspection may be compared to the vehicle characteristic(s) associated with the baseline signature(s), and/or the movement characteristic(s) of the vehicle system traveling over the route segment under inspection may be compared to the movement characteristic(s) associated with the baseline signature(s). This or these comparisons can be made to determine which, if any, of the baseline signatures have characteristics (e.g., vehicle, route, and/or movement) that are the same as or similar to the characteristic(s) associated with the acoustic signature.

At 312, one or more baseline signatures are selected for comparison based on the comparison between characteristics performed at 310. For example, the baseline signature or signatures having characteristics (e.g., vehicle, route, and/or movement) that are the same as or similar to the characteristic(s) associated with the acoustic signature may be selected. The characteristics may be the same when the characteristics have the same value (e.g., the same vehicle system weight, the same location along the route, the same moving speed, the same make or model of the vehicles, etc.). The characteristics may be similar when the characteristics do not have the same value, but have values that are relatively close to each other (e.g., the vehicle system weights are different but within 10% of each other, the locations along the route are different but within 50 meters of each other, the moving speeds are different but within 3% of each other, etc.).

Figure 4:
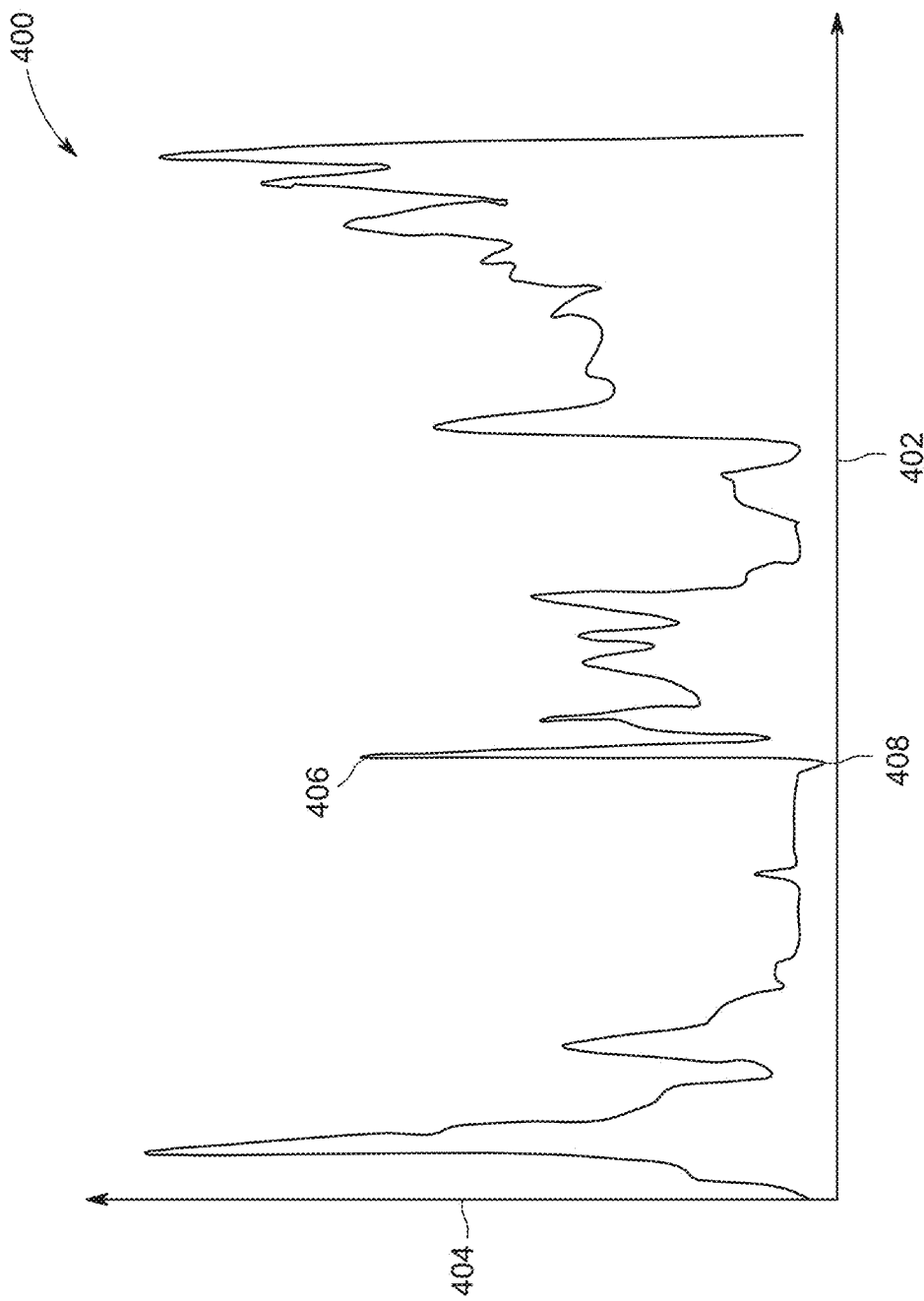
FIG. 4 illustrates one example of a baseline signature.

FIG. 4 illustrates one example of a baseline signature 400. The baseline signature is shown alongside a horizontal axis 402 representative of time during travel of a vehicle system over a healthy route segment and a vertical axis 404 representative of different magnitudes (e.g., decibels) of the sounds detected during travel of the vehicle system over the healthy route segment. Alternatively, the horizontal axis 402 can represent different frequencies of the sounds detected during travel of the vehicle system over the healthy route segment.

The baseline signature includes peaks 406 and valleys 408 at different locations along the horizontal axis 402. This indicates changing magnitudes of the sounds detected during travel over the healthy route segment associated with the baseline signature. The peaks and valleys for different baseline signatures may be in different locations due to the different characteristics of the vehicle system and/or route segments associated with the different baseline signatures.

The baseline signature shown in FIG. 4 may be selected from among several different baseline signatures due to similarities between the characteristics associated with the baseline signature and the acoustic signature of the route segment under investigation. For example, several different baseline signatures may be associated with the same location (e.g., the same fishplate) on a route. The different baseline signatures may be associated with different vehicle systems, vehicle systems having different weights or weight distributions, and/or vehicle systems moving over the same location at different speeds. The baseline signature having the characteristics that are the same as or more similar to the characteristics associated with the acoustic signature (than one or more, or all, other baseline signatures) may be selected for comparing to the acoustic signature.

Figure 5:
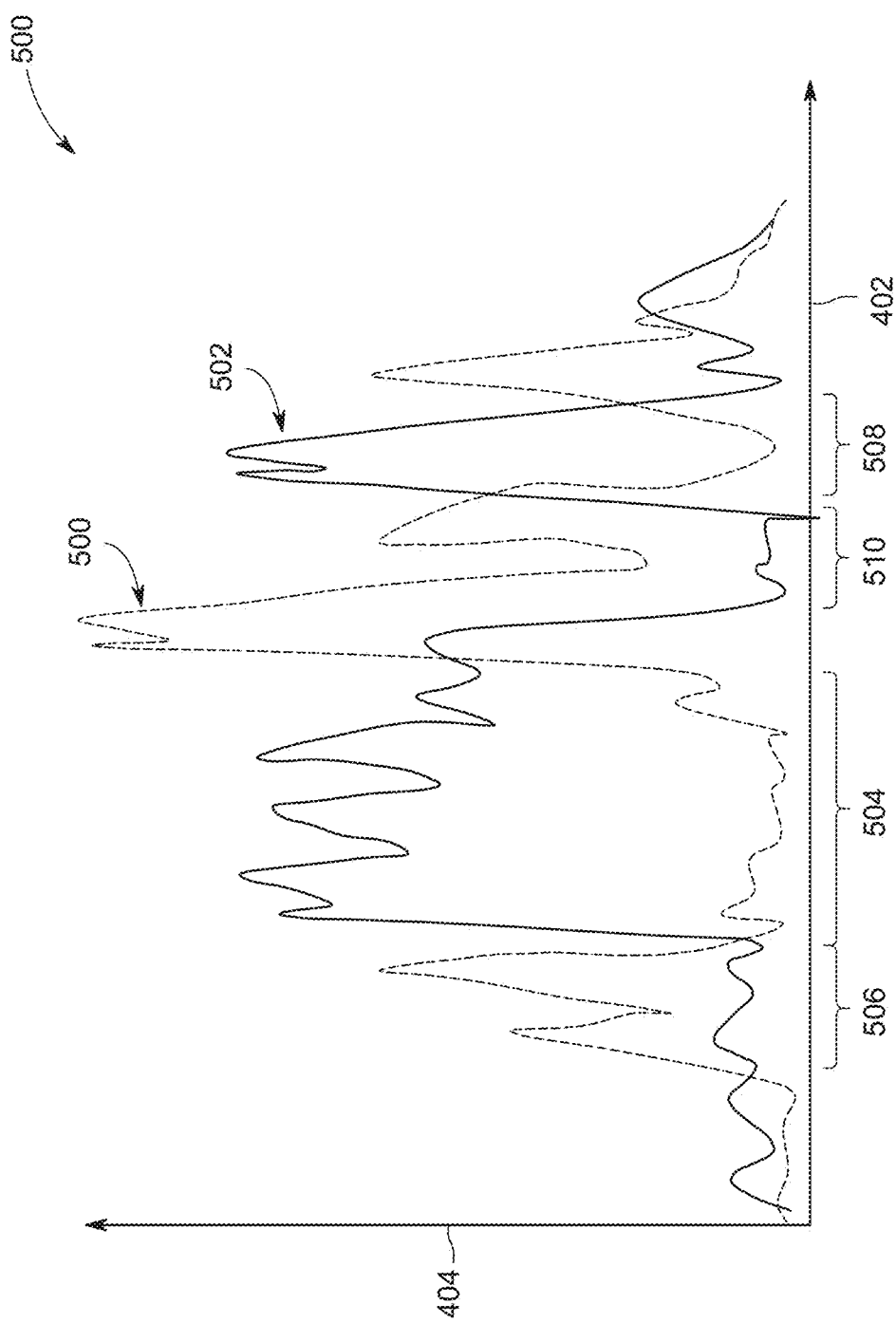
FIG. 5 illustrates a comparison of a selected baseline signature with an acoustic signature.

Returning to the description of the method 300 shown in FIG. 3, at 314, the acoustic signature is compared with the selected baseline signature. FIG. 5 illustrates a comparison of a selected baseline signature 500 with an acoustic signature 502. The baseline and acoustic signatures 500, 502 are shown alongside the horizontal and vertical axes 402, 404 described above. The baseline and acoustic signatures 500, 502 are compared to determine what differences, if any, exist between the baseline and acoustic signatures 500, 502. For example, the baseline and acoustic signatures 500, 502 can be compared to determine the presence of any peaks 406 in the acoustic signature 502 that are not present in the baseline signature 500 at the same or similar location along the horizontal axis 402 (e.g., within 10%, within 5%, or within 3%). As another example, the baseline and acoustic signatures 500, 502 can be compared to determine the absence of any peaks 406 in the acoustic signature 502 that are present in the baseline signature 500 at the same or similar location along the horizontal axis 402 (e.g., within 10%, within 5%, or within 3%). As another example, the baseline and acoustic signatures 500, 502 can be compared to determine the presence of any valleys 408 in the acoustic signature 502 that are present in the baseline signature 500 at the same or similar location along the horizontal axis 402 (e.g., within 10%, within 5%, or within 3%). As another example, the baseline and acoustic signatures 500, 502 can be compared to determine the absence of any valleys 408 in the acoustic signature 502 that are present in the baseline signature 500 at the same or similar location along the horizontal axis 402 (e.g., within 10%, within 5%, or within 3%).

In the illustrated example, the acoustic signature 502 includes several peaks 406 within difference regions 504, 508 that are not present in the baseline signature 500. The baseline signature 500 includes peaks 406 within other difference regions 506, 510 that are not present in the acoustic signature 502. These can be identified as differences between the baseline and acoustic signatures 500, 502.

Returning to the description of the flowchart of the method 300 shown in FIG. 3, at 316, a determination is made as to whether the differences between the acoustic signature and the selected baseline signature indicate damage to the route segment under inspection. Some differences may be associated with or indicative of damage to the route segment (e.g., a loose fishplate), while other differences may not be associated with or indicative of damage to the route segment. For example, the presence of peaks in the acoustic signature at one or more frequencies (that are not present in the selected baseline signature) may indicate a loose fishplate in the route segment under investigation, while the absence of peaks in the acoustic signature at one or more other frequencies (that are present in the selected baseline signature) may not indicate a loose fishplate.

If the differences between the acoustic signature and the selected baseline signature indicate damage to the route segment under investigation, then flow of the method 300 can proceed toward 318. Otherwise, flow of the method 300 may return toward 304 (for generating acoustic signatures for one or more other route segments under investigation) or optionally may terminate.

At 318, one or more responsive actions may be implemented. These actions may include slowing or stopping movement of the vehicle system, communicating a warning signal to an off-board facility (e.g., a dispatch or scheduling facility) to cause the facility to change or modify trajectories or schedules of other vehicle systems traveling toward or scheduled to travel toward the damaged route segment, communicating a signal to the off-board facility to initiate repair or inspection of the damaged route segment, etc. Flow of the method 300 may return toward 304 or optionally terminate following 318.

Figure 6:
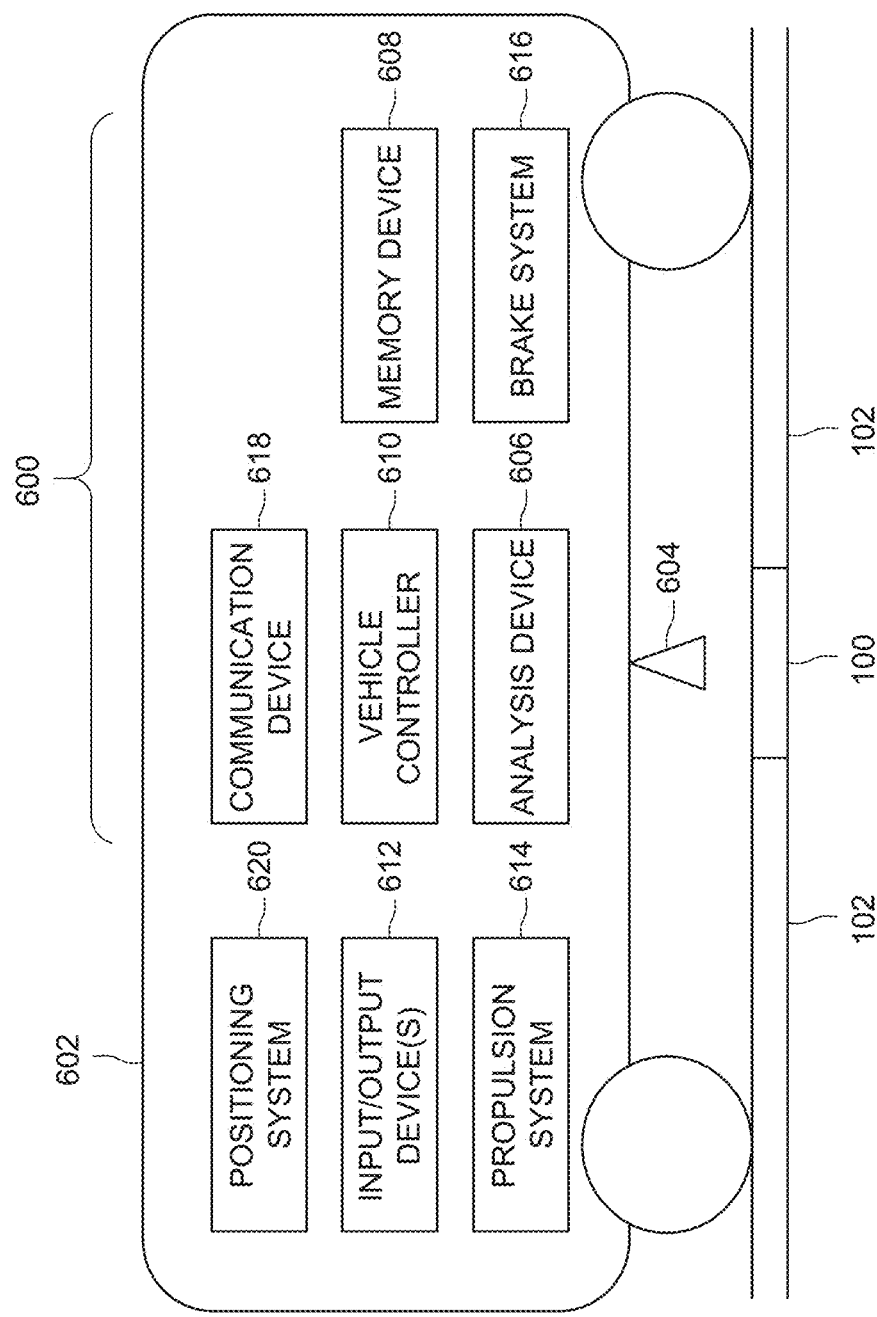
FIG. 6 illustrates a route examination system disposed onboard a vehicle system traveling along a route in accordance with one embodiment of the inventive subject matter.

FIG. 6 illustrates a route examination system 600 disposed onboard a vehicle system 602 traveling along the route 102 in accordance with one embodiment of the inventive subject matter. The vehicle system 602 is shown as a single vehicle, but may include two or more vehicles (propulsion-generating and/or non-propulsion-generating vehicles). While the examination system 600 is shown as being disposed onboard the vehicle system 602, optionally, one or more components of the examination system 600 may be off-board the vehicle system 602.

The vehicle system 602 includes plural acoustic sensors 604 that detect sounds during as the vehicle system 602 moves along the route 102. While only a single sensor 604 is shown in the illustrated embodiment, the vehicle system 602 may include additional sensors 604. The sensors 604 may be acoustic pick-up devices, such as microphones.

The examination system 600 includes an analysis device 606 that represents hardware circuitry that includes and/or is connected with one or more processors (e.g., one or more microprocessors, field programmable gate arrays, integrated circuits, etc.) that perform various operations described herein. The analysis device 606 may generate or determine baseline or acoustic signatures based on sounds detected by the sensors 604, may compare the characteristics associated with an acoustic signature with the characteristics associated with different baseline signatures in order to select a baseline signature for comparison, may identify differences between acoustic and baseline signatures, and/or may identify which differences indicate damage to the route. The characteristics associated with different signatures may be stored in a memory device 608 of the examination system 600, along with differences that indicate damage to the route. The analysis device 606 may refer to the information stored in the memory device 608 to perform the operations described herein. The memory device 608 can represent one or more computer hard drives, flash drives, optical disks, etc.

A vehicle controller 610 represents hardware circuitry that includes and/or is connected with one or more processors (e.g., one or more microprocessors, field programmable gate arrays, integrated circuits, etc.) that control operation of the vehicle system 602. The vehicle controller 610 may receive input from and/or present output via one or more input and/or output devices 612 ("Input/Output Device(s)" in FIG. 6), such as one or more keyboards, touchscreens, microphones, speakers, displays, pedals, buttons, switches, levers, etc. Some vehicle characteristics, route characteristics, and/or movement characteristics may be provided or obtained via the input/output device 612. Optionally, the vehicle controller 610 can receive instructions for controlling movement of the vehicle system 602 via the input/output device 612, such as throttle settings, brake settings, etc.

The vehicle controller 610 may generate and communicate control signals (based on the input that is received) to a propulsion system 614 and/or brake system 616 to control movement of the vehicle system 602. These control signals may be based on input provided by an operator via the input/output devices 612, based on differences between the acoustic and baseline signatures identified by the analysis device 606, or the like. The control signals may direct the propulsion system 614 to change how fast or slow the vehicle system 602 is moving, and/or may direct the brake system 616 to engage or release brakes. The propulsion system 614 can include one or more engines, generators, alternators, traction motors, or the like. The brake system 616 may include one or more air brakes, friction brakes, regenerative brakes (e.g., one or more traction motors of the propulsion system 614), or the like.

A communication device 618 represents transceiving circuitry and associated hardware (e.g., antennas, routers, modems, etc.) for communicating signals via wired and/or wireless connections. The communication device 618 may wirelessly communicate with an off-board location, such as a dispatch facility, repair facility, other vehicle in the same vehicle system, other vehicle system, etc.

A positioning system 620 represents hardware circuitry that determines one or more locations of the vehicle system 602. The positioning system 620 can represent one or more global positioning system receivers, one or more tachometers used by one or more processors to determine a location of the vehicle system 602 using dead reckoning, one or more antennas (e.g., of the communication device 618) for triangulating the location of the vehicle system 602, etc.

In one embodiment, a system includes one or more processors configured to determine one or more of a characteristic of a vehicle system traveling over a segment of a route under inspection for damage, a characteristic of the route, or a characteristic of movement of the vehicle system over the segment of the route under inspection. The system also includes one or more acoustic pick-up devices configured to detect acoustic sounds generated by movement of the vehicle system over the segment of the route under inspection. The one or more processors are configured to select a baseline signature representative of previously sensed acoustic sounds generated by previous movement of the vehicle system or another vehicle system over the segment of the route when the segment was known to not be damaged, and to determine that the segment of the route under inspection is damaged based on a comparison between the baseline signature and the acoustic sounds generated by the movement of the vehicle system over the segment of the route under inspection.

Optionally, the one or more processors are configured to identify a loose fishplate of the route based on the comparison between the baseline signature and the acoustic sounds generated by the movement of the vehicle system over the segment of the route under inspection.

Optionally, the one or more processors are configured to slow or stop movement of the vehicle system responsive to determining that the segment of the route under inspection is damaged.

Optionally, the one or more processors are configured to determine the one or more of the characteristic of the vehicle system, the characteristic of the route, or the characteristic of movement of the vehicle system by determining the characteristic of the vehicle system as one or more of a size of the vehicle system, a weight of the vehicle system, a distribution of weight along a length of the vehicle system, relative locations of vehicles in the vehicle system, a type of one or more engines in the vehicle system, or a location of the one or more engines in the vehicle system relative to a location of the one or more acoustic pick-up devices.

Optionally, the one or more processors are configured to determine the one or more of the characteristic of the vehicle system, the characteristic of the route, or the characteristic of movement of the vehicle system by determining the characteristic of the route as one or more of a location of the segment of the route under inspection or a type of route feature being investigated for damage.

Optionally, the one or more processors are configured to determine the one or more of the characteristic of the vehicle system, the characteristic of the route, or the characteristic of movement of the vehicle system by determining the characteristic of the movement of the vehicle system as one or more of a moving speed of the vehicle system or a speed at which one or more engines of the vehicle system operate during the movement of the vehicle system over the segment of the route under inspection.

Optionally, different baseline signatures are associated with one or more different characteristics of the vehicle system or another vehicle system, different characteristics of the route or another route, or different characteristics of the movement of the vehicle system or another vehicle system.

Optionally, the one or more processors are configured to select the baseline signature from among the different baseline signatures based on a comparison of (a) the one or more of the characteristic of the vehicle system traveling over the segment of the route under inspection, the characteristic of the route, or the characteristic of the movement of the vehicle system over the segment of the route under inspection with (b) the one or more different characteristics of the vehicle system or another vehicle system, different characteristics of the route or another route, or different characteristics of the movement of the vehicle system or another vehicle system associated with the different baseline signatures.

Optionally, the vehicle system is a rail vehicle or an automobile.

In one embodiment, a method includes determining one or more of a characteristic of a vehicle system traveling over a segment of a route under inspection for damage, a characteristic of the route, or a characteristic of movement of the vehicle system over the segment of the route under inspection, detecting (with one or more acoustic pick-up devices) acoustic sounds generated by movement of the vehicle system over the segment of the route under inspection, selecting a baseline signature representative of previously sensed acoustic sounds generated by previous movement of the vehicle system or another vehicle system over the segment of the route when the segment of the route was known to be healthy, and determining that the segment of the route under inspection is damaged based on a comparison between the baseline signature and the acoustic sounds generated by the movement of the vehicle system over the segment of the route under inspection.

Optionally, determining that the segment of the route under inspection is damaged includes identifying a loose fishplate of the route based on the comparison between the baseline signature and the acoustic sounds generated by the movement of the vehicle system over the segment of the route under inspection.

Optionally, the method also includes slowing or stopping movement of the vehicle system responsive to determining that the segment of the route under inspection is damaged.

Optionally, determining the one or more of the characteristic of the vehicle system, the characteristic of the route, or the characteristic of movement of the vehicle system includes determining the characteristic of the vehicle system as one or more of a size of the vehicle system, a weight of the vehicle system, a distribution of weight along a length of the vehicle system, relative locations of vehicles in the vehicle system, a type of one or more engines in the vehicle system, or a location of the one or more engines in the vehicle system relative to a location of the one or more acoustic pick-up devices.

Optionally, determining the one or more of the characteristic of the vehicle system, the characteristic of the route, or the characteristic of movement of the vehicle system includes determining the characteristic of the route as one or more of a location of the segment of the route under inspection or a type of route feature being investigated for damage.

Optionally, determining the one or more of the characteristic of the vehicle system, the characteristic of the route, or the characteristic of movement of the vehicle system includes determining the characteristic of the movement of the vehicle system as one or more of a moving speed of the vehicle system or a speed at which one or more engines of the vehicle system operate during the movement of the vehicle system over the segment of the route under inspection.

Optionally, different baseline signatures are associated with one or more different characteristics of the vehicle system or another vehicle system, different characteristics of the route or another route, or different characteristics of the movement of the vehicle system or another vehicle system.

Optionally, selecting the baseline signature includes selecting the baseline signature from among the different baseline signatures based on a comparison of (a) the one or more of the characteristic of the vehicle system traveling over the segment of the route under inspection, the characteristic of the route, or the characteristic of the movement of the vehicle system over the segment of the route under inspection with (b) the one or more different characteristics of the vehicle system or another vehicle system, different characteristics of the route or another route, or different characteristics of the movement of the vehicle system or another vehicle system associated with the different baseline signatures.

Optionally, the vehicle system is a rail vehicle or an automobile.

In one embodiment, a system includes one or more processors configured to determine determining a characteristic of a rail vehicle traveling over a segment of a track under inspection, a characteristic of the track under inspection, and a characteristic of movement of the rail vehicle system over the segment of the track under inspection. The system also includes one or more acoustic pick-up devices configured to detect acoustic sounds generated by movement of the rail vehicle system over the segment of the track. The one or more processors are configured to select a baseline signature representative of previously sensed acoustic sounds generated by movement of another rail vehicle system over a healthy segment of the track, and to determine that the segment of the track under inspection has a loose fishplate based on a comparison between the baseline signature and the acoustic sounds generated by the movement of the rail vehicle system over the segment of the track under inspection.

Optionally, the one or more processors are configured to slow or stop movement of the rail vehicle system responsive to determining that the fishplate is loose.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the inventive subject matter and also to enable one of ordinary skill in the art to practice the embodiments of inventive subject matter, including making and using any devices or systems and performing any incorporated methods. The patentable scope of the inventive subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the present inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the present inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

What is claimed is:

1. A system comprising:
one or more processors configured to determine one or more characteristics of a vehicle system or a segment of a route under inspection, the one or more characteristics that are determined including one or more of a distribution of weight along a length of the vehicle system, first locations of vehicles in the vehicle system, a type of one or more engines in the vehicle system, a second location of the one or more engines in the vehicle system, a third location of the segment of the route under inspection, a type of feature in the segment of the route being investigated for damage, or a speed at which one or more engines of the vehicle system operate; and
one or more acoustic pick-up devices configured to detect acoustic sounds generated by movement of the vehicle system over the segment of the route under inspection,
the one or more processors configured to select a baseline signature using the one or more characteristics that are determined, the baseline signature representative of previously sensed acoustic sounds generated by previous movement of the vehicle system or another vehicle system over the segment of the route while the segment of the route was known to have no damage,
the one or more processors configured to determine that the segment of the route under inspection is now damaged based on a comparison between the baseline signature and the acoustic sounds generated by the movement of the vehicle system over the segment of the route under inspection,
the one or more processors configured to slow or stop the movement of the vehicle system responsive to determining that the segment of the route under inspection is damaged.

2. The system of claim 1, wherein the one or more processors are configured to identify a loose fishplate of the route based on the comparison between the baseline signature and the acoustic sounds generated by the movement of the vehicle system over the segment of the route under inspection.

3. The system of claim 1, wherein the one or more processors are configured to also determine one or more of a size of the vehicle system or a weight of the vehicle system as the one or more characteristics.

4. The system of claim 1, wherein the one or more processors are configured to also determine a moving speed of the vehicle system as the one or more characteristics.

5. The system of claim 1, wherein the one or more processors are configured to select the baseline signature from among different baseline signatures that are associated with one or more of different characteristics of the vehicle system or another vehicle system, different characteristics of the route or another route, or different characteristics of the movement of the vehicle system or another vehicle system.

6. The system of claim 5, wherein the one or more processors are configured to select the baseline signature from among the different baseline signatures based on a comparison of (a) the one or more characteristics with (b) one or more of the different characteristics of the vehicle system or another vehicle system, the different characteristics of the route or another route, or the different characteristics of the movement of the vehicle system or another vehicle system associated with the different baseline signatures.

7. The system of claim 1, wherein the vehicle system is a rail vehicle or an automobile.

8. The system of claim 1, wherein the one or more processors are configured to determine the second location of the one or more engines in the vehicle system as the one or more characteristics, the second location of the one or more engines being a relative location of the one or more engines to the one or more acoustic pick-up devices.

9. A method comprising:
  determining one or more characteristics of a vehicle system or a segment of a route under inspection for damage, the one or more characteristics that are determined including one or more of a distribution of weight along a length of the vehicle system, first locations of vehicles in the vehicle system, a type of one or more engines in the vehicle system, a second location of the one or more engines in the vehicle system, a third location of the segment of the route under inspection, a type of feature in the segment of the route being investigated for damage, or a speed at which one or more engines of the vehicle system operate;
  detecting, with one or more acoustic pick-up devices, acoustic sounds generated by movement of the vehicle system over the segment of the route under inspection;
  selecting a baseline signature using the one or more characteristics that are determined, the baseline signature representative of previously sensed acoustic sounds generated by previous movement of the vehicle system or another vehicle system over the segment of the route while the segment of the route was known to have no damage;
  determining that the segment of the route under inspection is damaged based on a comparison between the baseline signature and the acoustic sounds generated by the movement of the vehicle system over the segment of the route under inspection; and
  slowing or stopping the movement of the vehicle system responsive to determining that the segment of the route under inspection is damaged.

10. The method of claim 9, wherein determining that the segment of the route under inspection is damaged includes identifying a loose fishplate of the route based on the comparison between the baseline signature and the acoustic sounds generated by the movement of the vehicle system over the segment of the route under inspection.

11. The method of claim 9, wherein determining the one or more characteristics also includes determining one or more of a size of the vehicle system or a weight of the vehicle system.

12. The method of claim 9, wherein determining the one or more characteristics also includes determining a moving speed of the vehicle system.

13. The method of claim 9, wherein the baseline signature is selected from among different baseline signatures that are associated with one or more of different characteristics of the vehicle system or another vehicle system, different characteristics of the route or another route, or different characteristics of the movement of the vehicle system or another vehicle system.

14. The method of claim 13, wherein selecting the baseline signature includes selecting the baseline signature from among the different baseline signatures based on a comparison of (a) the one or more characteristics with (b) one or more of the different characteristics of the vehicle system or another vehicle system, the different characteristics of the route or another route, or the different characteristics of the movement of the vehicle system or another vehicle system associated with the different baseline signatures.

15. The method of claim 9, wherein the vehicle system is a rail vehicle or an automobile.

16. A system comprising:
  one or more processors configured to determine one or more of a characteristic of a first rail vehicle system traveling over a segment of a track under inspection for damage, a characteristic of the track, or a characteristic of movement of the first rail vehicle system over the segment of the track under inspection; and
  one or more acoustic pick-up devices configured to detect acoustic sounds generated by movement of the first rail vehicle system over the segment of the track,
  wherein the one or more processors are configured to select a baseline signature using the one or more of the characteristic of the first rail vehicle system, the characteristic of the track, or the characteristic of the movement of the first rail vehicle system, the baseline signature representative of previously sensed acoustic sounds generated by previous movement of a second rail vehicle system over a healthy segment of the track, and to determine that the segment of the track under inspection has a loose fishplate based on a comparison between the baseline signature and the acoustic sounds generated by the movement of the first rail vehicle system over the segment of the track under inspection, and
  wherein the one or more processors are configured to slow or stop movement of the first rail vehicle system responsive to determining that the fishplate is loose.

17. The system of claim 16, wherein the one or more processors are configured to determine the one or more of the characteristic of the first rail vehicle system as one or more of a size of the first rail vehicle system, a weight of the first rail vehicle system, a distribution of weight along a length of the first rail vehicle system, relative locations of rail vehicles in the first rail vehicle system, a type of one or more engines in the first rail vehicle system, or a location of the one or more engines in the first rail vehicle system relative to a location of the one or more acoustic pick-up devices.

18. The system of claim 16, wherein the one or more processors are configured to determine the characteristic of the track as one or more of a location of the segment of the track under inspection or a type of route feature being investigated for damage.

19. The system of claim 16, wherein the one or more processors are configured to determine the characteristic of the movement of the first rail vehicle system as one or more of a moving speed of the first rail vehicle system or a speed at which one or more engines of the first rail vehicle system operate during the movement of the first rail vehicle system over the segment of the track under inspection.

20. The system of claim 16, wherein the one or more processors are configured to select the baseline signature from among different baseline signatures that are associated with one or more of different characteristics of the first rail vehicle system or the second rail vehicle system, different characteristics of the track or another track, or different characteristics of the movement of the first rail vehicle system or the second rail vehicle system.

* * * * *